US009269049B2

(12) United States Patent
McCann et al.

(10) Patent No.: US 9,269,049 B2
(45) Date of Patent: Feb. 23, 2016

(54) METHODS, APPARATUS, AND SYSTEMS FOR USING A REDUCED ATTRIBUTE VECTOR OF PANEL DATA TO DETERMINE AN ATTRIBUTE OF A USER

(71) Applicant: EXELATE, New York, NY (US)

(72) Inventors: Patrick McCann, Herndon, VA (US); Matthew Fornari, New York, NY (US); Kevin Lyons, New York, NY (US)

(73) Assignee: EXELATE, INC., New York, NY (US)

( * ) Notice: Subject to any disclaimer, the term of this patent is extended or adjusted under 35 U.S.C. 154(b) by 256 days.

(21) Appl. No.: 13/889,588

(22) Filed: May 8, 2013

(65) Prior Publication Data
US 2014/0337275 A1 Nov. 13, 2014

(51) Int. Cl.
*G06F 9/44* (2006.01)
*G06N 7/02* (2006.01)
*G06N 7/06* (2006.01)
*G06N 5/04* (2006.01)

(52) U.S. Cl.
CPC ...................................... *G06N 5/048* (2013.01)

(58) Field of Classification Search
None
See application file for complete search history.

(56) References Cited

U.S. PATENT DOCUMENTS

| 5,550,928 A | 8/1996 | Lu et al. |
| 5,710,833 A | 1/1998 | Moghaddam et al. |
| 5,848,396 A | 12/1998 | Gerace |
| 5,948,061 A | 9/1999 | Merriman et al. |
| 5,991,735 A | 11/1999 | Gerace |
| 6,026,368 A | 2/2000 | Brown et al. |
| 6,134,532 A | 10/2000 | Lazarus et al. |
| 6,594,691 B1 | 7/2003 | McCollum et al. |
| 6,662,215 B1 | 12/2003 | Moskowitz et al. |
| 6,925,440 B1 | 8/2005 | Shkedi |
| 6,973,436 B1 | 12/2005 | Shkedi |
| 6,983,379 B1 | 1/2006 | Spalink et al. |
| 7,039,599 B2 | 5/2006 | Merriman et al. |
| 7,062,510 B1 | 6/2006 | Eldering |

(Continued)

FOREIGN PATENT DOCUMENTS

CA 2252568 11/1997

OTHER PUBLICATIONS

Saar-Tsechansky et al. "Handling Missing Values when Applying Classification Models", Journal of Machine Learning Research 8, 2007, pp. 1625-1657.*

(Continued)

*Primary Examiner* — Li-Wu Chang
(74) *Attorney, Agent, or Firm* — Hanley, Flight & Zimmerman, LLC

(57) ABSTRACT

Methods, system, and media for scaling a panel of users with known attributes to determine an unknown attribute of a user are disclosed. An unclassified attribute vector of the user may be received. The unclassified attribute vector may comprise first attributes and first attribute values. A reduced attribute vector may be produced using the unclassified attribute vector and a projection matrix. The reduced attribute vector may have fewer attributes than the unclassified attribute vector. A plurality of reduced panel attribute vectors may be produced using a plurality of classified panel attribute vectors of users from the panel and the projection matrix. The reduced panel attribute vectors may have fewer attributes than the classified panel attribute vectors. The unknown attribute of the user may be determined based on the reduced attribute vector, the plurality of reduced panel attribute vectors, and the known attributes.

30 Claims, 9 Drawing Sheets

(56) References Cited

U.S. PATENT DOCUMENTS

| | | |
|---|---|---|
| 7,072,853 B2 | 7/2006 | Shkedi |
| 7,089,195 B2 | 8/2006 | Rosenberg |
| 7,162,522 B2 | 1/2007 | Adar et al. |
| 7,428,493 B2 | 9/2008 | Shkedi |
| 7,454,364 B2 | 11/2008 | Shkedi |
| 7,496,943 B1 | 2/2009 | Goldberg et al. |
| 7,533,012 B2 | 5/2009 | Walsh et al. |
| 7,617,122 B2 | 11/2009 | Kumar et al. |
| 7,991,800 B2 | 8/2011 | Lawrence et al. |
| 8,019,777 B2 | 9/2011 | Hauser |
| 8,024,323 B1 | 9/2011 | Nayfeh |
| 8,027,879 B2 | 9/2011 | Ramer et al. |
| 8,073,738 B2 | 12/2011 | Protheroe et al. |
| 8,108,245 B1 | 1/2012 | Hosea et al. |
| 8,234,166 B2 | 7/2012 | Filice et al. |
| 8,296,643 B1 | 10/2012 | Vasilik |
| 8,321,273 B2 | 11/2012 | Briggs |
| 2002/0049687 A1 | 4/2002 | Helsper et al. |
| 2002/0116258 A1 | 8/2002 | Stamatelatos et al. |
| 2003/0014304 A1 | 1/2003 | Calvert et al. |
| 2003/0033196 A1 | 2/2003 | Tomlin |
| 2003/0036949 A1 | 2/2003 | Kaddeche et al. |
| 2003/0058277 A1* | 3/2003 | Bowman-Amuah .......... 345/765 |
| 2003/0088485 A1 | 5/2003 | Feinberg |
| 2003/0135460 A1 | 7/2003 | Talegon |
| 2003/0167212 A1 | 9/2003 | Monteverde |
| 2004/0003036 A1 | 1/2004 | Eagle et al. |
| 2004/0015397 A1 | 1/2004 | Barry et al. |
| 2004/0024632 A1 | 2/2004 | Perry |
| 2004/0117460 A1 | 6/2004 | Walsh et al. |
| 2004/0117486 A1 | 6/2004 | Bourne et al. |
| 2004/0199397 A1 | 10/2004 | Dresden |
| 2005/0165643 A1 | 7/2005 | Wilson et al. |
| 2005/0166233 A1 | 7/2005 | Beyda et al. |
| 2005/0187818 A1 | 8/2005 | Zito et al. |
| 2005/0193020 A1 | 9/2005 | Shkedi |
| 2005/0222901 A1 | 10/2005 | Agarwal et al. |
| 2005/0235030 A1 | 10/2005 | Lauckhart et al. |
| 2005/0246736 A1 | 11/2005 | Beyda et al. |
| 2006/0026061 A1 | 2/2006 | Collins |
| 2006/0041562 A1 | 2/2006 | Paczkowski et al. |
| 2006/0059042 A1 | 3/2006 | Zohar |
| 2006/0212349 A1 | 9/2006 | Brady |
| 2006/0212350 A1 | 9/2006 | Ellis et al. |
| 2006/0242267 A1 | 10/2006 | Grossman |
| 2006/0282328 A1 | 12/2006 | Gerace et al. |
| 2007/0022009 A1 | 1/2007 | Cataldi et al. |
| 2007/0061195 A1 | 3/2007 | Liu et al. |
| 2007/0067215 A1 | 3/2007 | Agarwal et al. |
| 2007/0088609 A1 | 4/2007 | Reller et al. |
| 2007/0168506 A1 | 7/2007 | Douglas et al. |
| 2007/0294401 A1 | 12/2007 | Shkedi |
| 2008/0010155 A1 | 1/2008 | Shkedi |
| 2008/0040175 A1 | 2/2008 | Dellovo |
| 2008/0183561 A1 | 7/2008 | Zohar et al. |
| 2008/0195462 A1 | 8/2008 | Magdon-Ismail et al. |
| 2008/0209037 A1 | 8/2008 | Zernik et al. |
| 2008/0243531 A1 | 10/2008 | Hyder et al. |
| 2008/0243592 A1 | 10/2008 | Song et al. |
| 2008/0263627 A1 | 10/2008 | Berteau et al. |
| 2008/0275980 A1 | 11/2008 | Hansen |
| 2009/0006363 A1 | 1/2009 | Canny et al. |
| 2009/0024546 A1 | 1/2009 | Ficcaglia et al. |
| 2009/0055332 A1 | 2/2009 | Lee |
| 2009/0063250 A1 | 3/2009 | Burgess et al. |
| 2009/0063268 A1 | 3/2009 | Burgess et al. |
| 2009/0106296 A1 | 4/2009 | Sickmiller et al. |
| 2009/0125398 A1 | 5/2009 | Cochran et al. |
| 2009/0150126 A1 | 6/2009 | Sellamanickam et al. |
| 2010/0082507 A1 | 4/2010 | Ganapathi et al. |
| 2010/0082808 A1 | 4/2010 | Vaynblat et al. |
| 2010/0088177 A1 | 4/2010 | Lu et al. |
| 2010/0100415 A1 | 4/2010 | Plummer et al. |
| 2010/0179855 A1 | 7/2010 | Chen et al. |
| 2010/0228595 A1 | 9/2010 | Dempster et al. |
| 2010/0241510 A1 | 9/2010 | Zhang |
| 2010/0332426 A1 | 12/2010 | Van Bemmel |
| 2011/0004682 A1 | 1/2011 | Honnold et al. |
| 2011/0125587 A1 | 5/2011 | Netzer et al. |
| 2011/0131099 A1 | 6/2011 | Shields et al. |
| 2011/0166927 A1 | 7/2011 | Bandi et al. |
| 2011/0173063 A1 | 7/2011 | Bhatia et al. |
| 2011/0173071 A1 | 7/2011 | Meyer et al. |
| 2011/0187717 A1 | 8/2011 | Jagannath et al. |
| 2011/0191169 A1 | 8/2011 | Cui et al. |
| 2011/0191170 A1 | 8/2011 | Zhang et al. |
| 2011/0191191 A1 | 8/2011 | Bax et al. |
| 2011/0208591 A1 | 8/2011 | Chen et al. |
| 2011/0218866 A1 | 9/2011 | Wilson |
| 2011/0231242 A1 | 9/2011 | Dilling et al. |
| 2011/0231244 A1 | 9/2011 | Bhatia et al. |
| 2011/0231245 A1 | 9/2011 | Bhatia et al. |
| 2011/0231246 A1 | 9/2011 | Bhatia et al. |
| 2011/0231253 A1 | 9/2011 | Crawford et al. |
| 2011/0238468 A1 | 9/2011 | Shen et al. |
| 2011/0246285 A1 | 10/2011 | Ratnaparkhi et al. |
| 2011/0258052 A1 | 10/2011 | Kakade et al. |
| 2011/0258054 A1 | 10/2011 | Pandey et al. |
| 2011/0270670 A1 | 11/2011 | Leathern |
| 2011/0270686 A1 | 11/2011 | Patwa et al. |
| 2011/0276391 A1 | 11/2011 | Hillard et al. |
| 2011/0282732 A1 | 11/2011 | Bax et al. |
| 2011/0282815 A1 | 11/2011 | Thomas |
| 2011/0310891 A1 | 12/2011 | Howe et al. |
| 2012/0004979 A1 | 1/2012 | Bhatia et al. |
| 2012/0004980 A1 | 1/2012 | Bhatia et al. |
| 2012/0004981 A1 | 1/2012 | Bhatia et al. |
| 2012/0010942 A1 | 1/2012 | Bax et al. |
| 2012/0022952 A1 | 1/2012 | Cetin et al. |
| 2012/0023043 A1 | 1/2012 | Cetin et al. |
| 2012/0036007 A1 | 2/2012 | Robertson et al. |
| 2012/0036008 A1 | 2/2012 | Robertson et al. |
| 2012/0066072 A1 | 3/2012 | Kanigsberg et al. |
| 2012/0078705 A1 | 3/2012 | Megdal |
| 2012/0078709 A1 | 3/2012 | Dunham et al. |
| 2012/0078711 A1 | 3/2012 | Mehta et al. |
| 2012/0084149 A1 | 4/2012 | Gaudiano et al. |
| 2012/0095845 A1 | 4/2012 | Shani |
| 2012/0095848 A1 | 4/2012 | Chan |
| 2012/0095985 A1 | 4/2012 | Shen et al. |
| 2012/0109745 A1 | 5/2012 | Bhamidipati |
| 2012/0116843 A1 | 5/2012 | Karty |
| 2012/0116885 A1 | 5/2012 | Krishnamoorthy |
| 2012/0123851 A1 | 5/2012 | Bax et al. |
| 2012/0123859 A1 | 5/2012 | Gupta |
| 2012/0123863 A1 | 5/2012 | Kaul et al. |
| 2012/0150641 A1 | 6/2012 | Dobbs et al. |
| 2012/0166272 A1 | 6/2012 | Wiley et al. |
| 2012/0173326 A1 | 7/2012 | Tao et al. |
| 2012/0191528 A1 | 7/2012 | Bax et al. |
| 2012/0203642 A1 | 8/2012 | Park et al. |
| 2012/0253928 A1 | 10/2012 | Jackson et al. |
| 2012/0278158 A1 | 11/2012 | Farahat |
| 2012/0290403 A1 | 11/2012 | Galitzky et al. |
| 2014/0067478 A1 | 3/2014 | Zenor |
| 2014/0140625 A1* | 5/2014 | Zhang et al. .................. 382/195 |

OTHER PUBLICATIONS

"Nielsen Bridges Online and Offline Behaviors with Innovative Cross-Platform Offering," The Nielsen Company, 2012, Retrieved from the internet: Aug. 14, 2012, pp. 1-2.

"Online Advertising," Fresh Patents.com, Retrieved from the internet: Nov. 20, 2012, pp. 1-2, http://tgs.freshpatents.com/Online-Advertising-bx1.phphttp://tgs.freshpatents.com/Online-Advertising-bx1.php , retrieved on Nov. 20, 2012.

LaRue, "eXelate, Nielsen Catalina Solutions Partner to Bring CPG Data Online," Adotas, Jan. 31, 2012, Retrieved from the internet: Aug. 14, 2012, pp. 1-2.

(56) References Cited

OTHER PUBLICATIONS

Lykou et al., "Sparse CCA using a Lasso with positivity constraints," Computational Statistics and Data Analysis, 2010 vol. 54, pp. 3144-3157.

Soltani et al., "Flash Cookies and Privacy," 2009, Summer Undergraduate Program in Engineering Research at Berkeley (SUPERB), pp. 158-163.

Stage et al., "Measuring Similarity in Nearest Neighbor Imputation: Some New Alternatives," Proceedings of the Symposium on Statistics and Information technology in Forestry, 2003, pp. 1-6.

Witten et al., "A penalized matrix decomposition, with applications to sparse principal components and canonical correlation analysis," Biostatistics, 2009, vol. 10, No. 3, pp. 515-534.

Conducted by Intromart by Hilversum, the Netherlands, "Continuous TV Audience Survey in the Netherlands, A Methodological Description", Edition 3, Aug. 1996, 69 pages.

Stadler et al., "Pattern Alternating Maximization Algorithm for Missing Data in "Large P, Small N" Problems", Nov. 21, 2012, The Netherlands Cancer Institute, Seminar Fur Statistik, ETH Zurich, 26 pages.

\* cited by examiner

|  | 320-1 | 320-2 | 320-3 | 320-4 | 320-5 | ... | 320-M |
|---|---|---|---|---|---|---|---|
| 310-1 | 1 | 0 | 1 | 1 | 0 | ... | 0 |
| 310-2 | 1 | 0 | 0 | 0 | 0 | ... | 1 |
| 310-3 | 0 | 1 | 0 | 0 | 1 | ... | 1 |
| ... | ... | ... | ... | ... | ... | ... | ... |
| 310-N | 1 | 0 | 1 | 1 | 0 | ... | 0 |

| | 420-1 | 420-2 | 420-3 | 420-4 | 420-5 | ... | 420-J |
|---|---|---|---|---|---|---|---|
| 410-1 | 1 | 0 | 1 | 1 | 0 | ... | 0 |
| 410-2 | 1 | 0 | 0 | 0 | 0 | ... | 1 |
| 410-3 | 0 | 1 | 0 | 0 | 1 | ... | 1 |
| ... | ... | ... | ... | ... | ... | ... | ... |
| 410-N | 1 | 0 | 1 | 1 | 0 | ... | 0 |

| | 520-1 | 520-2 | 520-3 | 520-4 | 520-5 | ... | 520-Q |
|---|---|---|---|---|---|---|---|
| 510-1 | 1 | 0 | 1 | 1 | 0 | ... | 0 |
| 510-2 | 1 | 0 | 0 | 0 | 0 | ... | 1 |
| 510-3 | 0 | 1 | 0 | 0 | 1 | ... | 1 |
| ... | ... | ... | ... | ... | ... | ... | ... |
| 510-R | 1 | 0 | 1 | 1 | 0 | ... | 0 |

|  | 820-1 | 820-2 | 820-3 | 820-4 | 820-5 | ... | 820-C |
|---|---|---|---|---|---|---|---|
| 810-1 | 1 | 0 | 1 | 1 | 0 | ... | 1 |
| 810-2 | 1 | 0 | 0 | 1 | 0 | ... | 1 |
| 810-3 | 0 | 1 | 0 | 1 | 1 | ... | 1 |
| ... | ... | ... | ... | ... | ... | ... | ... |
| 810-B | 1 | 0 | 1 | 1 | 0 | ... | 0 |

800

METHODS, APPARATUS, AND SYSTEMS FOR USING A REDUCED ATTRIBUTE VECTOR OF PANEL DATA TO DETERMINE AN ATTRIBUTE OF A USER

BACKGROUND

Targeting and data collection techniques provide advertisers and other marketing organizations with market segment data related to advertising viewers, including, for example, computer users who view advertising on the World Wide Web (Web) or Internet. For advertising viewers such as Internet users, the available information related to each user depends, for example, on his or her historical Web behavior and, for example, on his or her origin environment, such as the user's computing platform, service provider, country, time of day, etc. A "market segment" or "segment" is a subset, or partial portion of a group that can be characterized in some way; a segment may also be a data object describing such a group.

Advertisers and other marketing organizations may create segment definitions to define groups of potential marketing targets (e.g., users) and direct advertising to those groups, such as groups of users on the Internet. "Data publishers" (or "data sellers") may sell information concerning targets or people, such as Internet users, and their behaviors, which advertisers and other marketing organizations may use to create, for example, behavioral segment definitions. An Internet user may access a Web site of a data publisher, such as a bicycling interest Web site, for example, and be identified as a user "interested in bicycling." Other attributes, such as time and location of the person's access, may also be identified. Data publishers may sell the identifying information about users who access their sites and receive income from sales based on this information's use.

User identification (ID) data from data publishers can be used to create segment definitions. In general, segment definitions may be characterized by specific values for available properties. For example, segment definitions might exist for categories such as "Gender", "Age" and "Nationality" and one segment combination might be defined with three properties as, "Male, 35-40, European." Once identified (e.g., from information from a data publisher (data seller)), a user who fits the characteristics of "Male, 35-40, European" can be grouped into and/or associated with this segment combination. An advertisement can be exposed to (or placed) with users identified with the segment combination, and data can be collected to determine how the users identified with that segment respond. Behavioral segment definitions for "Shopping Interest", "Running Interest" and "Web surfing interest" can be defined and Behavioral attributes, such as "likes to shop", "intensely likes running" or "Web surfs in the evening" can also be included in segment combinations. Segment combinations can have attributes that are purely behavioral, purely non-behavioral or a mixture of behavioral and non-behavioral.

The efficacy of a given advertisement depends on the match between the content of the advertisement (advertising content) and the market segment to which the content is exposed. In practice, a numeric "conversion ratio" value describes the efficiency or "success" relationship between the advertising content and target segment. A high conversion ratio value can show, for example, by various measures or various methods of determining or collecting such data, that a given advertisement or advertising campaign (group of advertisements) is well received by a given target segment.

It is perceived within the advertising and marketing industries that, in general, better and more accurate segment targeting capabilities could improve conversion ratios. High conversion ratios for advertisements, on the Internet and in other advertising venues, such as, e.g., print, outdoor, direct are desirable. Identification, for example, of a large user group with a high response rate to advertising and with members who respond in stable and predictable manners over time is desirable.

With the development of the Internet advertising market, information about the people most likely to visit a website and information about the people most likely to purchase a product from visiting a website is increasingly more valuable. These people may be classified into modeled audience extensions, which defines segments that define users most likely to take certain actions. More accurate and efficient identification of modeled audience extensions can lead to more conversions and better return on investment for advertising money spent.

However, it is difficult to collect comprehensive, meaningful, and useful attribute information for a large number of users with a large number of potential attributes. For example, attribute information may be collected for users while browsing the Internet, in which the number of tracked attributes may be in the millions. A user may have attributes corresponding to visiting one or more websites, the time and date of visiting websites, and whether orders were placed on websites. As a result, it is frequently difficult to ascertain values for all or even a substantial number of the attributes, because users may not have been in situations in which the values could be collected. Similarly, tracking online behavior may yield little or no information about offline information, such as the purchasing habits or attitudes of users when conducting offline transactions.

In general, there is a need for improved techniques for scaling a panel, in the advertising and marketing fields in general and, in particular, with regard to Internet advertising.

SUMMARY

Various embodiments are generally directed to scaling a panel to overcome the aforementioned problems.

One embodiment may include a method for scaling a panel of users with known attributes to determine an unknown attribute of a user, the method comprising: receiving, by one or more computers, an unclassified attribute vector of the user, the unclassified attribute vector comprising first attributes and first attribute values; producing, by the one or more computers, a reduced attribute vector using the unclassified attribute vector and a projection matrix, wherein the reduced attribute vector has fewer attributes than the unclassified attribute vectors; producing, by the one or more computers, a plurality of reduced panel attribute vectors using a plurality of classified panel attribute vectors of users from the panel and the projection matrix, wherein the reduced panel attribute vectors have fewer attributes than the classified panel attribute vectors, and wherein the user is not one of the users from the panel; and determining, by the one or more computers, the unknown attribute of the user based on the reduced attribute vector, the plurality of reduced panel attribute vectors, and the known attributes, wherein each of the known attributes corresponds to a different reduced panel attribute vector.

One embodiment may include a method for scaling a panel, the method comprising: receiving a first unclassified attribute matrix of a first plurality of users from a first panel; producing a reduced attribute matrix using the first unclassified attribute matrix and a projection matrix; producing a reduced panel attribute matrix using a classified panel attribute matrix from a second panel and the projection matrix, wherein the first panel and the second panel are different and users represented by the reduced panel attribute matrix are not shared between the first panel and the second panel; and determining, by one or more computers, unknown attributes of the first plurality of users based on the reduced attribute matrix, the reduced panel attribute matrix, and a plurality of known attributes that correspond to the reduced panel attribute matrix.

One embodiment may include a system for scaling a panel of users with known attributes to determine an unknown attribute of a user, the system comprising: a memory; and a processor configured to: receive an unclassified attribute vector of the user, the unclassified attribute vector comprising first attributes and first attribute values; produce a reduced attribute vector using the unclassified attribute vector and a projection matrix, wherein the reduced attribute vector has fewer attributes than the unclassified attribute vectors; produce a plurality of reduced panel attribute vectors using a plurality of classified panel attribute vectors of users from the panel and the projection matrix, wherein the reduced panel attribute vectors have fewer attributes than the classified panel attribute vectors, and wherein the user is not one of the users from the panel; and determine the unknown attribute of the user based on the reduced attribute vector, the plurality of reduced panel attribute vectors, and the known attributes, wherein each of the known attributes corresponds to a different reduced panel attribute vector.

One embodiment may include a system for scaling a panel, the system comprising: a memory; and a processor configured to: receive a first unclassified attribute matrix of a first plurality of users from a first panel; produce a reduced attribute matrix using the first unclassified attribute matrix and a projection matrix; produce a reduced panel attribute matrix using a classified panel attribute matrix from a second panel and the projection matrix, wherein the first panel and the second panel are different and users represented by the reduced panel attribute matrix are not shared between the first panel and the second panel; and determine unknown attributes of the first plurality of users based on the reduced attribute matrix, the reduced panel attribute matrix, and a plurality of known attributes that correspond to the reduced panel attribute matrix.

One embodiment may include a computer readable storage medium for scaling a panel of users with known attributes to determine an unknown attribute of a user, the computer readable storage medium comprising instructions that if executed enable a computing system to: receive an unclassified attribute vector of the user, the unclassified attribute vector comprising first attributes and first attribute values; produce a reduced attribute vector using the unclassified attribute vector and a projection matrix, wherein the reduced attribute vector has fewer attributes than the unclassified attribute vectors; produce a plurality of reduced panel attribute vectors using a plurality of classified panel attribute vectors of users from the panel and the projection matrix, wherein the reduced panel attribute vectors have fewer attributes than the classified panel attribute vectors, and wherein the user is not one of the users from the panel; and determine the unknown attribute of the user based on the reduced attribute vector, the plurality of reduced panel attribute vectors, and the known attributes, wherein each of the known attributes corresponds to a different reduced panel attribute vector One embodiment may include a computer readable storage medium for scaling a panel, the computer readable storage medium comprising instructions that if executed enable a computing system to: receive a first unclassified attribute matrix of a first plurality of users from a first panel; produce a reduced attribute matrix using the first unclassified attribute matrix and a projection matrix; produce a reduced panel attribute matrix using a classified panel attribute matrix from a second panel and the projection matrix, wherein the first panel and the second panel are different and users represented by the reduced panel attribute matrix are not shared between the first panel and the second panel; and determine unknown attributes of the first plurality of users based on the reduced attribute matrix, the reduced panel attribute matrix, and a plurality of known attributes that correspond to the reduced panel attribute matrix.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

Embodiments will now be described in connection with the associated drawings, in which:

FIG. 3 depicts an exemplary plurality of attribute vectors 300 in accordance with one or more embodiments.

FIG. 4 depicts an exemplary plurality of panel attribute vectors 400 in accordance with one or more embodiments.

FIG. 5 depicts an exemplary projection matrix 500 in accordance with one or more embodiments.

FIG. 8 depicts an exemplary attribute matrix 800 in accordance with one or more embodiments.

DETAILED DESCRIPTION OF THE DRAWINGS

Figure 1:
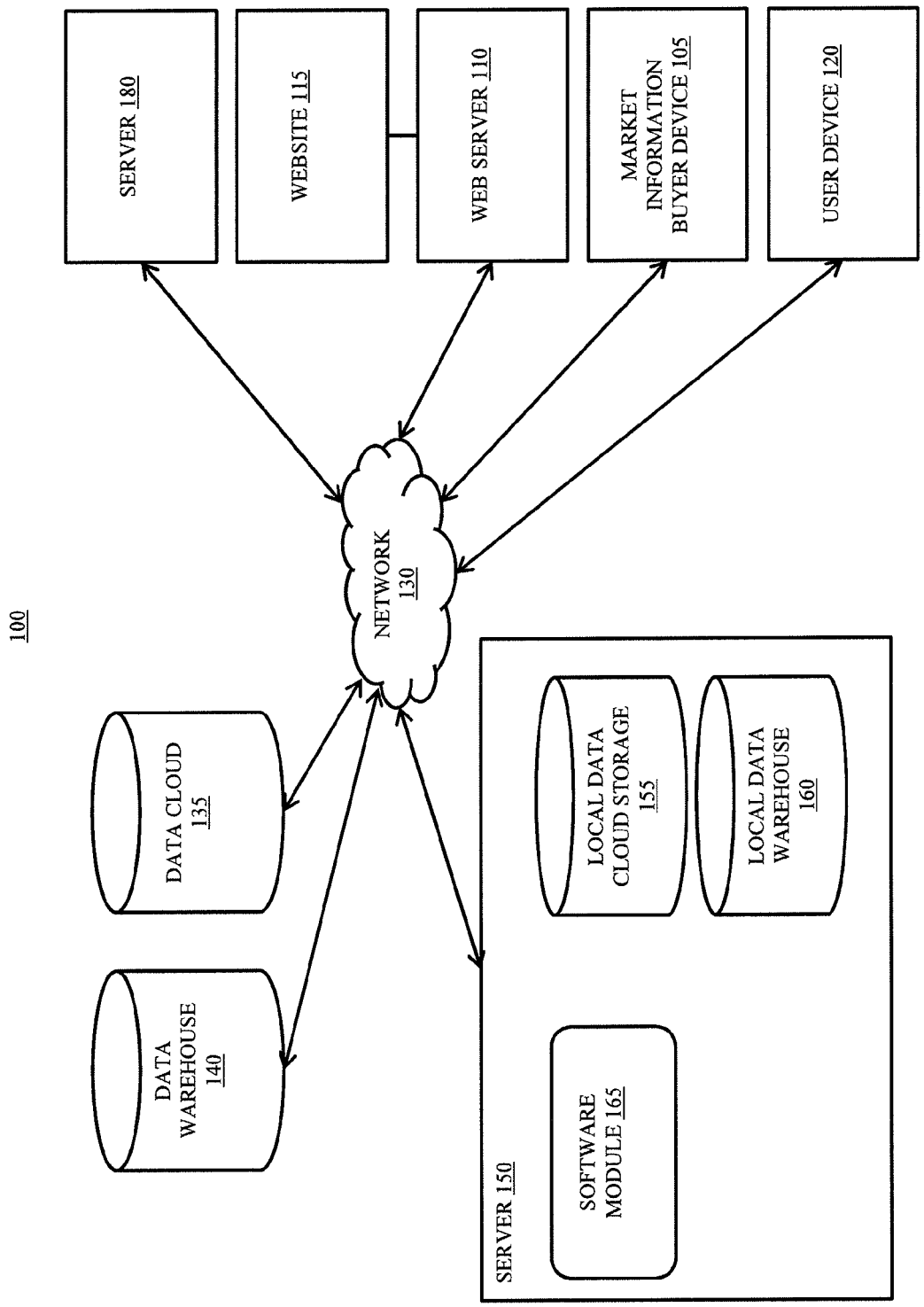
FIG. 1 depicts a schematic block diagram of an exemplary system in accordance with one or more embodiments.

Exemplary embodiments are discussed in detail below. While specific exemplary embodiments are discussed, it should be understood that this is done for illustration purposes only. In describing and illustrating the exemplary embodiments, specific terminology is employed for the sake of clarity. However, the embodiments are not intended to be limited to the specific terminology so selected. A person skilled in the relevant art will recognize that other components and configurations may be used without parting from the spirit and scope of the embodiments. It is to be understood that each specific element includes all technical equivalents that operate in a similar manner to accomplish a similar purpose. The examples and embodiments described herein are non-limiting examples.

The techniques described in this disclosure may use a rotation or projection matrix, which may be a matrix or other type of data structure. The rotation or projection matrix may provide information about which attributes are important for classifying similar users. A rotation or projection matrix may be formed by analyzing groups of attributes for one or more users. For example, one group of attributes may include very complete attribute information for a relatively small set of attributes when compared to another group. The other group of attributes may include incomplete attribute information for a larger number of attributes, in which many attribute values are unknown. The resulting rotation or project matrix formed from the analysis of these groups may determine which combination of attributes from both groups are significant for grouping users into meaningful classifications. Exemplary techniques for creating a rotation or projection matrix are described with respect to FIG. 2.

The techniques described in this disclosure may also be used to discover or assign unknown user attribute information, particularly in situations when it is difficult to collect comprehensive, meaningful, and useful attribute information for users with a large number of potential attributes. For example, an input set of attributes may be received. The input set of attributes may have one or more unknown or unclassified attribute values that are of interest. The values of interest may be determined using one or more of the following steps. The rotation or projection matrix may be applied to the input set of attributes to produce a first dataset (e.g. reduced attribute vector or reduced attribute matrix) that identifies attributes that are useful for classification and their values. The rotation or projection matrix may also be applied to another set of attributes of another group of users to produce a second dataset (e.g. a reduced panel attribute matrix or vectors) that also identifies attributes that are useful for classification and their values, and that also includes values for the attributes of interest.

Then, the first and second datasets may be compared to find one or more users in the second data set that are most similar to a user with an unknown attribute of interest in the first dataset. When the one or more most similar users are identified, their values for the attribute of interest can be evaluated to discover or assign the a value to the previously unknown value of the attribute of interest for the user of interest. As a result, one or more missing values can be predicted with a high degree of accuracy. Exemplary techniques for discovering or assigning unknown user attribute information are described with respect to FIG. 6.

FIG. 1 depicts a schematic block diagram of an exemplary system in accordance with one or more embodiments. System 100 may include market information buyer device 105, web server 110, website 115, user device 120, network 130, data cloud 135, data warehouse 140, server 150, local data cloud storage 155, local data warehouse 160, software module 165, and server 180.

Market information buyer device 105 and user device 120 may be any type of computing device, including a mobile telephone, a laptop, tablet, or desktop computer, a netbook, a video game device, a pager, a smart phone, an ultra-mobile personal computer (UMPC), or a personal data assistant (PDA). Market information buyer device 105 and user device 120 may run one or more applications, such as Internet browsers, voice calls, video games, videoconferencing, and email, among others. Market information buyer device 105 and user device 120 may be any combination of computing devices. These devices may be coupled to network 130. Market information buyer device 105 and user device 120 may store information in cookies and transmit the cookies or other information through network 130 to any other machine, including those depicted in FIG. 1.

Web server 110, server 150, or server 180 may also be any type of computing device coupled to network 130, including but not limited to a personal computer, a server computer, a series of server computers, a mini computer, and a mainframe computer, or combinations thereof. Web server 110, server 150, or server 180 may be a web server (or a series of servers) running a network operating system, examples of which may include but are not limited to Microsoft Windows Server, Novell NetWare, or Linux. Any of the features of server 150 may be also implemented in server 180 and vice versa.

Network 130 may provide network access, data transport and other services to the devices coupled to it. In general, network 130 may include and implement any commonly defined network architectures including those defined by standards bodies, such as the Global System for Mobile communication (GSM) Association, the Internet Engineering Task Force (IETF), and the Worldwide Interoperability for Microwave Access (WiMAX) forum. For example, network 130 may implement one or more of a GSM architecture, a General Packet Radio Service (GPRS) architecture, a Universal Mobile Telecommunications System (UMTS) architecture, and an evolution of UMTS referred to as Long Term Evolution (LTE). Network 130 may, again as an alternative or in conjunction with one or more of the above, implement a WiMAX architecture defined by the WiMAX forum. Network 130 may also comprise, for instance, a local area network (LAN), a wide area network (WAN), the Internet, a virtual LAN (VLAN), an enterprise LAN, a layer 3 virtual private network (VPN), an enterprise IP network, or any combination thereof.

Website 115 may be any type of website or web page. For example, website 115 may be coded using hypertext markup language ("HTML"), XML, XHTML, JavaScript, Java, Perl, Visual Basic, Hypertext Preprocessor scripts ("PHP"), Active Server Page scripts ("ASP"), common gate interface ("CGI") scripts, server side includes, and combinations thereof.

Data cloud 135 may be any combination of hardware or software used to store information in a distributed and redundant manner Data cloud 135 may be implemented in or managed by server 150 as local data cloud storage 155, server 180, other servers, or any combination thereof. Data cloud 135 may be distributed across a number of devices, in which each device may replicate all of the data or portions of the data stored on any combination of devices used by data cloud 135. Data cloud 135 may be configured to be updated in real-time when one or more of the devices housing data cloud 135 receives new data. For example, when information is added to or stored on data cloud 135 by server 150, the information may be distributed to other servers maintaining data cloud 135 in real-time. Data cloud 135 may be configured to store any type or combination of data. Data cloud 135 may be configured to only store data for a certain period of time. For example, data cloud 135 may expunge any data that has been in data cloud 135 for more than 60 days. The period of time may be any period of time.

Data warehouse 140 and local data warehouse 160 may be any type of database, including databases managed by a database management system (DBMS). A DBMS is typically implemented as an engine that controls organization, storage, management, and retrieval of data in a database. DBMSs frequently provide the ability to query, backup and replicate, enforce rules, provide security, do computation, perform change and access logging, and automate optimization. Examples of DBMSs include Oracle database, IBM DB2, Adaptive Server Enterprise, FileMaker, Microsoft Access, Microsoft SQL Server, MySQL, PostgreSQL, and a NoSQL implementation, such as Hadoop or MongoDB. A DBMS typically includes a modeling language, data structure, database query language, and transaction mechanism. The modeling language is used to define the schema of each database in the DBMS, according to the database model, which may include a hierarchical model, network model, relational model, object model, or some other applicable known or convenient organization. Data structures can include fields, records, files, objects, and any other applicable known or convenient structures for storing data. A DBMS may also include metadata about the data that is stored.

Software module 165 may be a module that is configured to send, process, and receive information at server 150. Software module 165 may provide another mechanism for sending and receiving data at server 150 besides handling requests through web server 110. Software module 165 may send and receive information using any technique for sending and receiving information between processes or devices including using a scripting language, a remote procedure call, an email, a tweet, an application programming interface, Simple Object Access Protocol (SOAP) methods, Common Object Request Broker Architecture (CORBA), any interface for software components to communicate with each other, using any other known technique for sending information from a one device to another, or any combination thereof.

Figure 2:
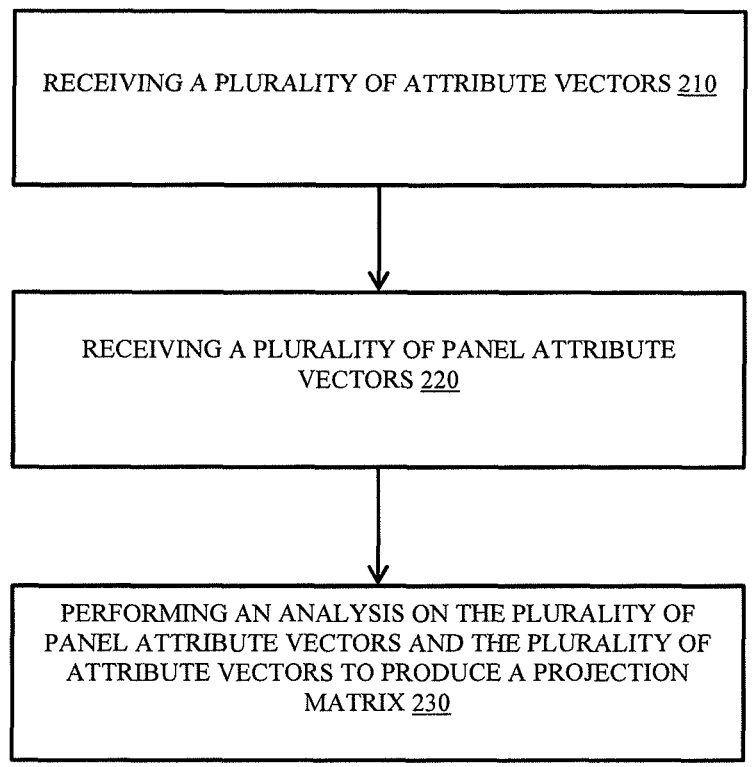
FIG. 2 depicts a block flow diagram of an exemplary method for creating a projection matrix in accordance with one or more embodiments.

FIG. 2 depicts a block flow diagram of an exemplary method for creating a projection matrix in accordance with one or more embodiments.

In block 210, software module 165 may receive a plurality of attribute vectors. Software module 165 may receive the plurality of attribute vectors, for example, from one or more memories, one or more data storages, the Internet, one or more networked machines, one or more other machines, user input, one or more values stored in software module 165, or any combination thereof.

FIG. 3 depicts an exemplary plurality of attribute vectors 300 in accordance with one or more embodiments. The plurality of attribute vectors 300 may include attribute vectors 310-1 to 310-N. Each vector 310-1 to 310-N may correspond to a user. For example, vector 310-1 may correspond to a first user, and vector 310-N may correspond to an Nth user. The plurality of attribute vectors 300 may include M attributes, which may be stored in columns 320-1 to 320-M. The number of attribute vectors (N) and the number of attributes (M) are not limited to the range of values shown in FIG. 3 and may be any value, including values less than the number of items depicted in FIG. 3. Each attribute may have a range of potential values that may be stored in an attribute vector. For example, the attributes may have a value that is an integer, a Boolean value of true or false, 0 or 1, on or off, etc., a whole number, a real number, an enumerated value, a text value, items in a set, or any combination thereof. An attribute value may be null or undefined. A null or undefined value may represent information that has not yet been determined for the value of the attribute. The values for an attribute may be bounded within a certain range of possible values. For example, the value of attribute 320-1 may be any real number between 0 and 1.

In some embodiments, the plurality of attribute vectors 300 may represent information that may be acquired from tracking online user sessions. For example, the attributes may include a date for accessing a particular website; a time of accessing a particular website; whether or not a particular website has been accessed; whether or not an certain protocol has been used, e.g., ftp, http, https, etc.; frequency of access of a website by an entity; attributes disclosed by the user to the entity; user data from partner companies, which may include financial attributes or known purchase behavior; patterns derived from a user agent string; the Internet Service Provider (ISP); attributes of the ISP or a subdivision of an ISP; connection speed; location; attributes about a user's location; or any combination thereof. These exemplary attributes are not an exhaustive list of attributes, and other attributes may be tracked or used. A website may also refer to subsections of websites or groupings of similar websites.

In some embodiments, the attribute values may be determined any one or more of the embodiments disclosed in co-pending U.S. patent application Ser. No. 13/682,267 filed Nov. 20, 2012, entitled "MANAGING MODELED AUDIENCE EXTENSION INFORMATION," which is hereby incorporated herein by reference in its entirety.

In block 220, software module 165 may receive a plurality of panel attribute vectors. Software module 165 may receive the plurality of panel attribute vectors, for example, from one or more memories, one or more data storages, the Internet, one or more networked machines, one or more other machines, user input, one or more values stored in software module 165, or any combination thereof.

FIG. 4 depicts an exemplary plurality of panel attribute vectors 400 in accordance with one or more embodiments. The plurality of panel attribute vectors 400 may include panel attribute vectors 410-1 to 410-N. Each vector 410-1 to 410-N may correspond to a user. For example, vector 410-1 may correspond to a first user, and vector 410-N may correspond to an Nth user. The plurality of panel attribute vectors 400 may include J attributes, which may be stored in columns 420-1 to 420-J. The number of panel attribute vectors (N) and the number of attributes (J) are not limited to the range of values shown in FIG. 4 and may be any value, including values less than the number of items depicted in FIG. 4. Each attribute may have a range of potential values that may be stored in an attribute vector. For example, the attributes may have a value that is an integer, a Boolean value of true or false, 0 or 1, on or off, etc., a whole number, a real number, an enumerated value, a text value, items in a set, or any combination thereof. An attribute value may be null or undefined. A null or undefined value may represent information that has not yet been determined for the value of the attribute. The values for an attribute may be bounded within a certain range of possible values. For example, the value of attribute 420-1 may be any real number between 0 and 1.

In some embodiments, the plurality of panel attribute vectors 400 may represent information of a user's offline activities. For example, the attributes may include a date for accessing a particular store; a time of accessing a particular store; whether or not a particular store or location has been accessed; whether or not a user is of a certain demographic; survey responses; media (e.g. TV or radio) metering machine recordings; consumer diary data; or any combination thereof. An exemplary panel may have a detailed and complete information on many attributes for a small group of users. A small group may be one in which targeting the members of the group exclusively would not be sufficient to an advertiser's campaign needs. For example, if a survey is given to many thousands of users about their product purchasing habits, an advertiser would not want to constrict the survey's teachings about who to target with advertisements just to that group. Instead, it may be much more desirable to project the small group of people with detailed information onto a large group of people, which may refer to a group large enough to meet a client's advertising targeting needs. For example, a panel may include all of the answers to a survey, all of the purchases of members of a store loyalty card program, or all of the diary entries of a group of consumers participating in a diary program.

In some embodiments, the attribute values may be determined any one or more of the embodiments disclosed in co-pending U.S. patent application Ser. No. 13/682,267 filed Nov. 20, 2012, entitled "MANAGING MODELED AUDIENCE EXTENSION INFORMATION."

In some embodiments, the plurality of attribute vectors, the plurality of panel attribute vectors, or both the plurality of attribute vectors and the plurality of panel attribute vectors may be centered; scaled; normalized; regularized, in which low data values under a specified threshold are replaced with a value of zero; transformed; or any combination thereof. Transformations may include one or more of exponentiation of a panel attribute value (e.g. $e^x$), raising the panel attribute value to a power (e.g. $x^2$ or $x^{0.5}$), the logarithm of the panel attribute value (e.g. ln(x)), a trigonometric function of the panel attribute value (e.g. cos(x), sin(x), arctan(x)), a statistical function of the panel attribute value (e.g., quantile(x), or any other transformation of a panel attribute value, in which x represents a value of a panel attribute, e.g., a value in a panel attribute vector.

In block 230, software module 165 may perform an analysis on the plurality of attribute vectors and the plurality of panel attribute vectors to produce a rotation, e.g., a projection matrix. For example, the analysis may comprise at least one of a canonical correlation analysis (CCA), a principal component analysis (PCA), an independent component analysis (ICA), a co-correspondence analysis, or any adaptation thereof. The canonical correlation analysis may be a sparse canonical correlation analysis (SCCA). The resulting components from the CCA may be saved.

The CCA may be performed in accordance one or more embodiments described in "A Penalized Matrix Decomposition, with Applications to Sparse Principal Components and Canonical Correlation Analysis" by Witten et al., http://www.ncbi.nlm.nih.gov/pmc/articles/PMC2697346, the contents of which are hereby incorporated herein by reference. The CCA may be performed in accordance one or more embodiments described in "Sparse CCA using a Lasso with positivity constraints" by Lykou et al., Computational Statistics and Data Analysis 54 (2010), pp. 3144-3157, the contents of which are hereby incorporated herein by reference.

A projection matrix or rotation matrix may be formed by adapting the SCCA to replace the CCA in the most similar neighbor methodology of Mouer and Stage or Stage and Crooksten as according to one or more embodiments described in "Measuring Similarity in Nearest Neighbor Imputation: Some New Alternatives" by Stage et al., http://web.forestry.ubc.ca/prognosis/documents/MSN_Stage-Crooksten.pdf, Jan. 6, 2003, the contents of which are hereby incorporated herein by reference. Alternatively or additionally, other candidates rotations may be formed from a principal component analysis, Independent Component Analysis, canonical correspondence analysis, co-correspondence analysis, or their regularized (also called sparse or penalized) adaptations.

The better CCA based projector for most similar neighbor may be chosen by software module 165 depending on which projector give better performance on a holdout dataset. Candidate rotations may be evaluated either on their holdout or cross validation performance. Performance may be measured by an agreement statistic (e.g., Cohen's Kappa), evaluations of neighbor utilization, and/or distributional comparisons of the resulting predictions to the known distributions of the columns of matrix 400. Further, different candidate rotations of the same class, e.g. SCCAs with different regularization parameters, may be evaluated on these metrics either on their holdout or cross validation performance.

Some columns of 400 may not be explained well by 300*500, and they may be removed using techniques such as conditional rules or other classification techniques. For example, the techniques may include any one or more of the embodiments disclosed in co-pending U.S. patent application Ser. No. 13/782,930 filed Mar. 1, 2013, entitled "METHOD AND SYSTEM USING ASSOCIATION RULES TO FORM CUSTOM LISTS OF COOKIES," which is hereby incorporated herein by reference in its entirety. In some embodiments, 400 may be split into two or more parts based off of this analysis, in which case the procedure may be performed on one, some, or all of the resulting parts.

FIG. 5 depicts an exemplary projection matrix 500 in accordance with one or more embodiments. Projection matrix 500 may have R number of rows and Q number of columns.

Rows 510-1-510-R correspond to a plurality of columns in 300. If the number of rows R is not equal to the number of columns in 300, 300 is reformed to exclude columns not in 510-1-510-R. The columns in 300 are chosen based on columns that have a sum above a particular threshold (e.g. more than 5 users have attribute 320-2), a relationship of the column with some column in 400, or the presence of a non-zero row sum in 500. The number of columns Q may be chosen based on an f-test on the correlations produced by the sparse CCA or the CCA. Alternatively or in addition, the number of columns Q may be forced to be in an efficient range or chosen based on cross validation of the metrics discussed above. For example, the f-test may suggest nine significant columns of the rotation, the efficient range might be three to twenty-four, so nine columns would be chosen. In the case of an ICA or PCA, the f-test may not be available and the number of columns may be chosen based on a screen plot, the eigenvalues of the resulting matrix, or cross validation metrics. In some embodiments, only cross validation metrics may be used to select the number of columns Q. The f-test may be any weighted average of precision and recall. Precision may be a number of correct results divided by the number of all returned results. Recall may be the number of correct results divided by the number of results that could have been returned.

Figure 6:
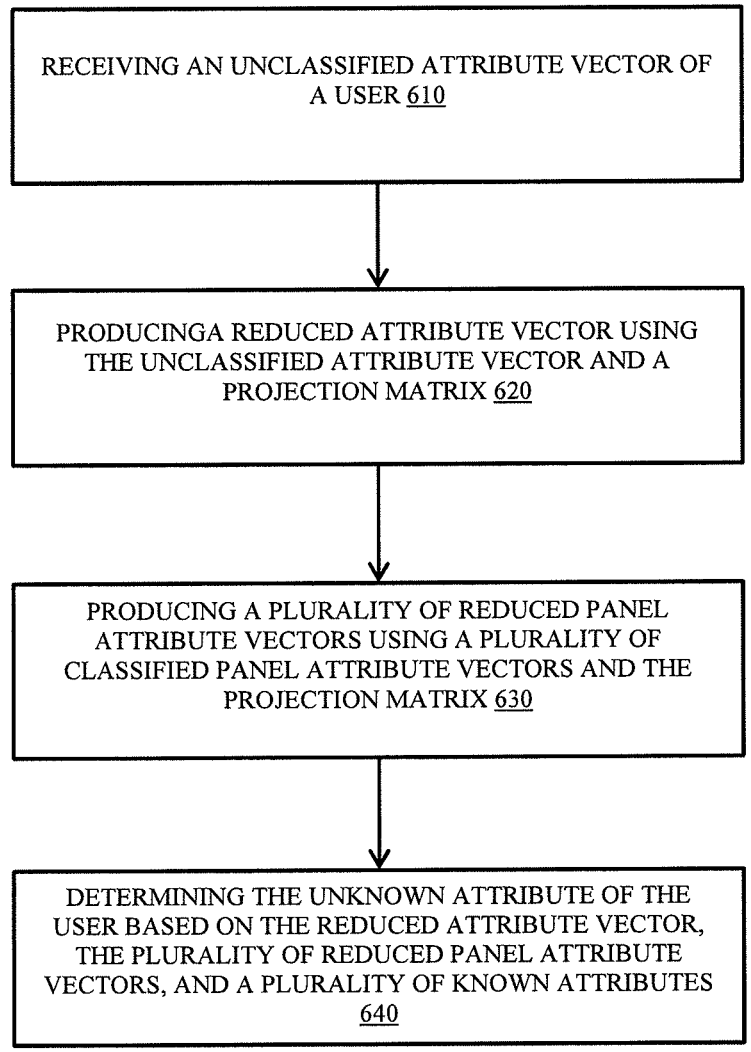
FIG. 6 depicts a block flow diagram of an exemplary method for scaling a panel in accordance with one or more embodiments.

FIG. 6 depicts a block flow diagram of an exemplary method for scaling a panel in accordance with one or more embodiments.

In block 610, software module 165 may receive an unclassified attribute vector of a user. The unclassified attribute vector may be a vector similar to 310-1. The unclassified attribute vector may be associated with a user for which the value of one or more attribute values are unknown. The unknown attribute values may be one or more attributes that are not attributes of the attribute vector.

Values for one or more of the attributes of the unclassified attribute value may specified in a cookie. The cookie may be received by software module 165, and the values read from the cookie and inserted into the unclassified attribute vector.

Figure 7:
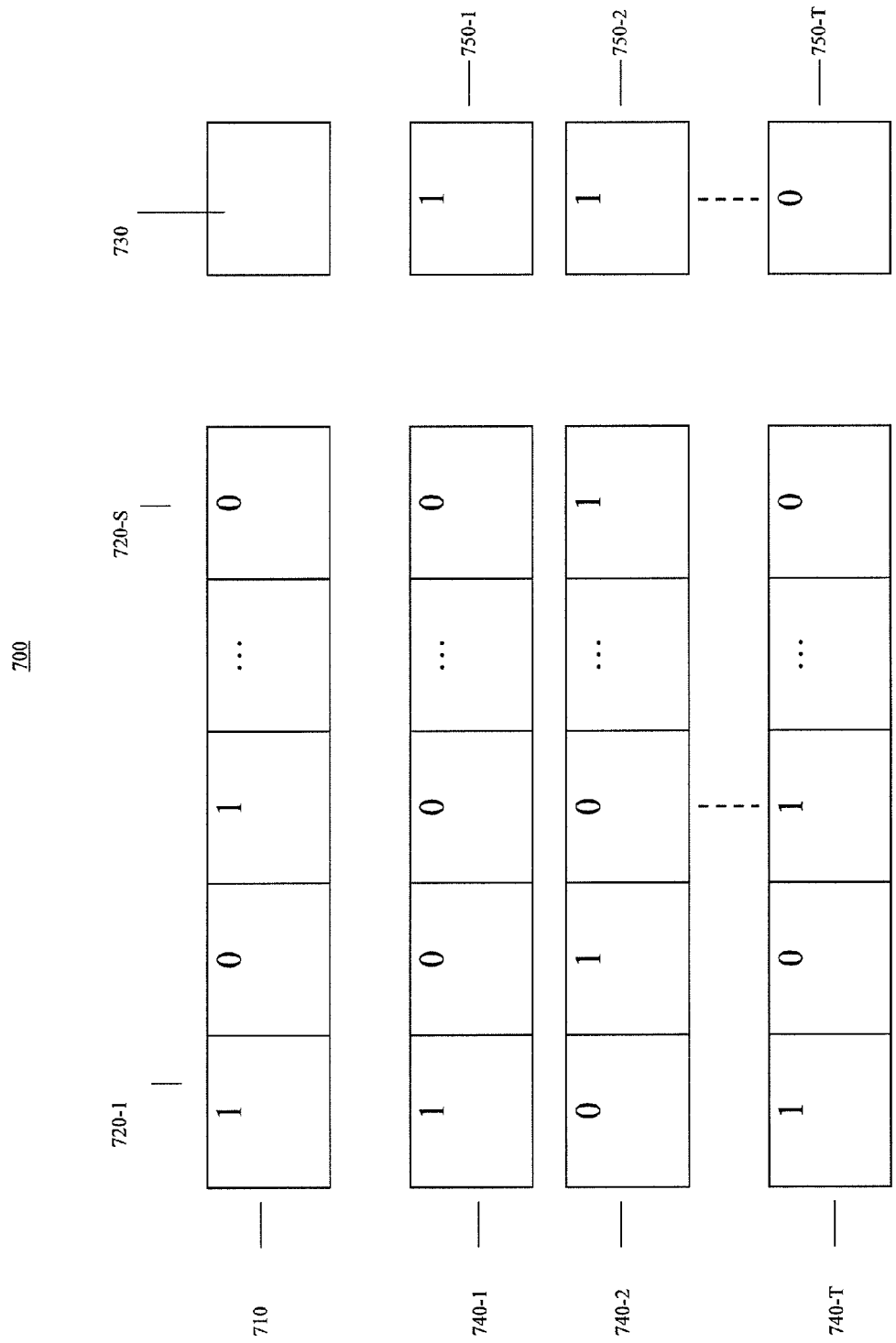
FIG. 7 depicts exemplary reduced attribute vectors in accordance with one or more embodiments.

In block 620, software module 165 may produce a reduced attribute vector using the unclassified vector and a projection matrix. The reduced attribute vector may represent attributes that are useful for classification and their values. The reduced attribute vector may be produced by vector multiplying the unclassified vector by the projection matrix. As a result, the reduced attribute vector may include fewer attributes than the unclassified vector, but the fewer attributes may be better for classifying similar users than all of the attributes of the reduced attribute vector. FIG. 7 depicts exemplary reduced attribute vectors in accordance with one or more embodiments. 710 may be the reduced attribute vector produced using the unclassified vector and a projection matrix. The reduced attribute vector may have values associated with S number of attributes. 730 may be the unknown attribute that corresponds to the user that corresponds to vector 710.

In block 630, software module 165 may produce a plurality of reduced panel attribute vectors using a plurality of classified panel attribute vectors and the projection matrix. The reduced panel attribute vectors may be produced by vector multiplying the classified panel attribute vectors by the projection matrix, e.g. 300×500. The classified panel attribute vectors may form a matrix, and the matrix may be used to produce the plurality of reduced panel attribute vectors. 740-1 to 740-T may be the plurality of reduced panel attribute vectors produced using the unclassified vector and a projection matrix. The plurality of reduced panel attribute vectors may have values associated with S number of attributes. 710 and 740-1-740-T may have the same number of columns S as the classified panel attribute vectors, e.g. M, but for users without a match in a panel such as the panel represented by 400. 750-1 to 750-T may be a plurality of known attributes that corresponds to the users that corresponds to vectors 740-1 to 740-T. For example, 740-2 may correspond to User 2, which may also have the attribute and attribute value shown in 750-2. Another set of reduced panel attribute vectors may be produced by vector multiplying the reduced panel attribute vectors by the projection matrix, e.g. 700×500. Each row of the other set of reduced panel attribute vectors may be compared in some way to the panel attribute vectors to determine the inferred panel attributes (e.g. the columns of 400) for the users in 740.

The number attributes of the reduced attribute vectors produced in block 620 or in block 630 may be substantially less than a the number of attributes of the unclassified attribute vector. As discussed above, the number of attributes of the reduced attribute vectors may be the number of attributes of the vector multiplication the classified panel attribute vectors and the projection matrix, e.g. the number of attributes Q in 300×500. For example, the number of columns in 300 and rows in 500 may be in the range of tens of thousands or more. Yet, the number of attributes of the reduced attribute vectors may range be substantially less, e.g. from 4 to 30. Finding neighbors in the rotated (canonical) space has at least the following three advantages. First, it is much more computationally feasible and allows strict computational deadlines to be met in the order of milliseconds. Second, the space has been chosen to maximally explain panel attribute vectors (e.g. 400) using a plurality of attribute vectors (e.g. 300), even more accurately than using all of 300 in the neighbor calculations. Third, the reduced space minimizes the appearance of hub users, or frequently found neighbors, by avoiding the curse of dimensionality common in this type of problem. In the case of the sparse CCA, an additional advantage emerges in that the projection matrix (e.g. 500) may have many elements equal to zero, which further improves computational efficiency.

In block 640, software module 165 may determine the unknown attribute of the user based on the reduced attribute vector, the plurality of reduced panel attribute vectors, and a plurality of known attributes.

In some embodiments, software module 165 may determine the unknown attribute of the user using a k-nearest neighbors approach. For example, software module 165 may identify one or more of the plurality of reduced panel attribute vectors as one or more nearest neighbors based on a similarity between the plurality of reduced panel attribute vectors and the reduced attribute vector. The number of nearest neighbors, k, may range from 1 to the number of vectors considered. For example, if k=1, only a single nearest neighbor is chosen.

Similarity between the plurality of reduced panel attribute vectors and the reduced attribute vector may be measured using one or more techniques. For example, the similarity may be measured by a distance. A distance may be a Euclidian, Manhattan, cosine similarity, Mahalanobis, or some other distance function. The distance algorithm may be modified by penalizing distances to neighbors by their historical match rate. A numeric or percentage match cap may be placed on a potential neighbor, which removes the potential neighbor from the plurality of reduced panel attribute vectors (e.g. from 300×500) for some period of time if their match rate exceeds some threshold, e.g. 1% of users in the plurality of reduced attribute vectors (e.g. 740). These techniques may be used in combination or alone. Alternatively or additionally, the nearest neighbors may be calculated exactly by brute force, or by any approximate nearest neighbor algorithm where in rare cases, perfect identification of the nearest match is sacrificed for computational efficiency of the search.

Software module 165 may determine the unknown attribute using one or more known attributes corresponding to the one or more nearest neighbors. The one or more nearest neighbors may vote on the value of the unknown attribute using the values of the plurality of the known attributes.

In some embodiments, a single nearest neighbor may be selected. In this instance, k=1. For example, the single nearest neighbor, e.g., 740-1, may vote for the value of the unknown attribute 730 using known attribute 750-1, and 730 would take the value of 750-1.

In some embodiments when multiple nearest neighbors are used (i.e., k>1), one or more voting techniques may be used. The respective votes of the multiple nearest neighbors may be weighted based on the distances each nearest neighbor to the reduced attribute vector. For example, contributions of the neighbors may be weighted, so that the nearer neighbors contribute more to determining the unknown attribute value than the more distant ones. A common weighting scheme is to give each neighbor a weight of 1/d, where d is the distance to the neighbor, which is a generalization of linear interpolation. However, any weighting scheme and any distance measurement scheme may be used.

After a value of the unknown attribute for a user is determined, the value of the attribute may be given a time-to-live period, after which the value expires. The time-to-live period may begin when the unknown attribute is determined. When the value expires, the unknown attribute may be marked as unknown, null, 0, or any other value to indicate to users or software module 165 that the value is no longer valid. The time to live period may be chosen based on client interaction. A minimum eligibility time may also be chosen. For example, a user may be eligible to be scored at 2 days with a time-to-live of 5 days.

The process for scaling a panel may be repeated to determine multiple unknown attributes of a user, an unknown attribute for multiple users, or any combination thereof. For example, the process for scaling a panel may be used to overlay one panel onto another so that the plurality of attribute vectors (e.g. 300 matrix) and the panel attribute vectors (e.g. 400 matrix) in a first iteration come from two different panels, and the users represented in the reduced panel attribute vectors (e.g. 740) is not shared between the two different panels, and the completion of the process to infer attributes for the reduced panel attribute vectors leads to a complete matrix with the combined columns of the plurality of attribute vectors (e.g. 300 matrix) and the panel attribute vectors (e.g. 400 matrix) and the combine rows of the plurality of attribute vectors (e.g. 300 matrix) and the reduced panel attribute vectors (e.g. 740). The resulting matrix can then be used as the panel attribute matrix in a second iteration of this process to scale the combined panel to an entire user base for distribution to advertisers and/or web analytics companies.

In some embodiments, a segment of users may be identified. The segment may be defined by a specific value for one or more attributes, ranges of values of one or more attributes, or any combination thereof. When attributes that define the segment for users are unknown, the process for scaling a panel may be used to determine those unknown attribute values. Then, users that meet the requirements for inclusion into the segment may be added to the segment. If an attribute value of a user expires, and inclusion in the segment requires that attribute value, the user having the expired attribute value may be removed from the segment.

FIG. 8 depicts an exemplary attribute matrix 800 in accordance with one or more embodiments. Exemplary segment 800 may comprise attribute vectors 810-1 to 810-B, where each of these vectors may correspond to a user. For example, vector 810-1 may correspond to a first user, and vector 810-B may correspond to an Bth user. The plurality of attribute vectors 800 may include C attributes, which may be stored in columns 820-1 to 820-C. The number of attribute vectors (B) and the number of attributes (C) are not limited to the range of values shown in FIG. 8 and may be any value, including values less than the number of items depicted in FIG. 8.

The users in exemplary attribute matrix 800 all have the same value for attribute 820-4. As a result, a segment defined by the 820-4 attribute having a value of 1 would include the users corresponding to attribute vectors 810-1 to 810-B. The attribute value for 820-4 for each user corresponding to vectors 810-1 to 810-B may have been determined by a process for scaling a panel, such as the process described herein. The process may have determined an attribute value for attribute 820-4 for more users than the ones that corresponding to vectors 810-1 to 810-B, which may have had different values. Although attribute matrix 800 is used to describe the features of a segment created by a panel-scaling process, a segment may be identified without the use of a matrix, in which only the values of one or more attributes that correspond to users is used.

Figure 9:
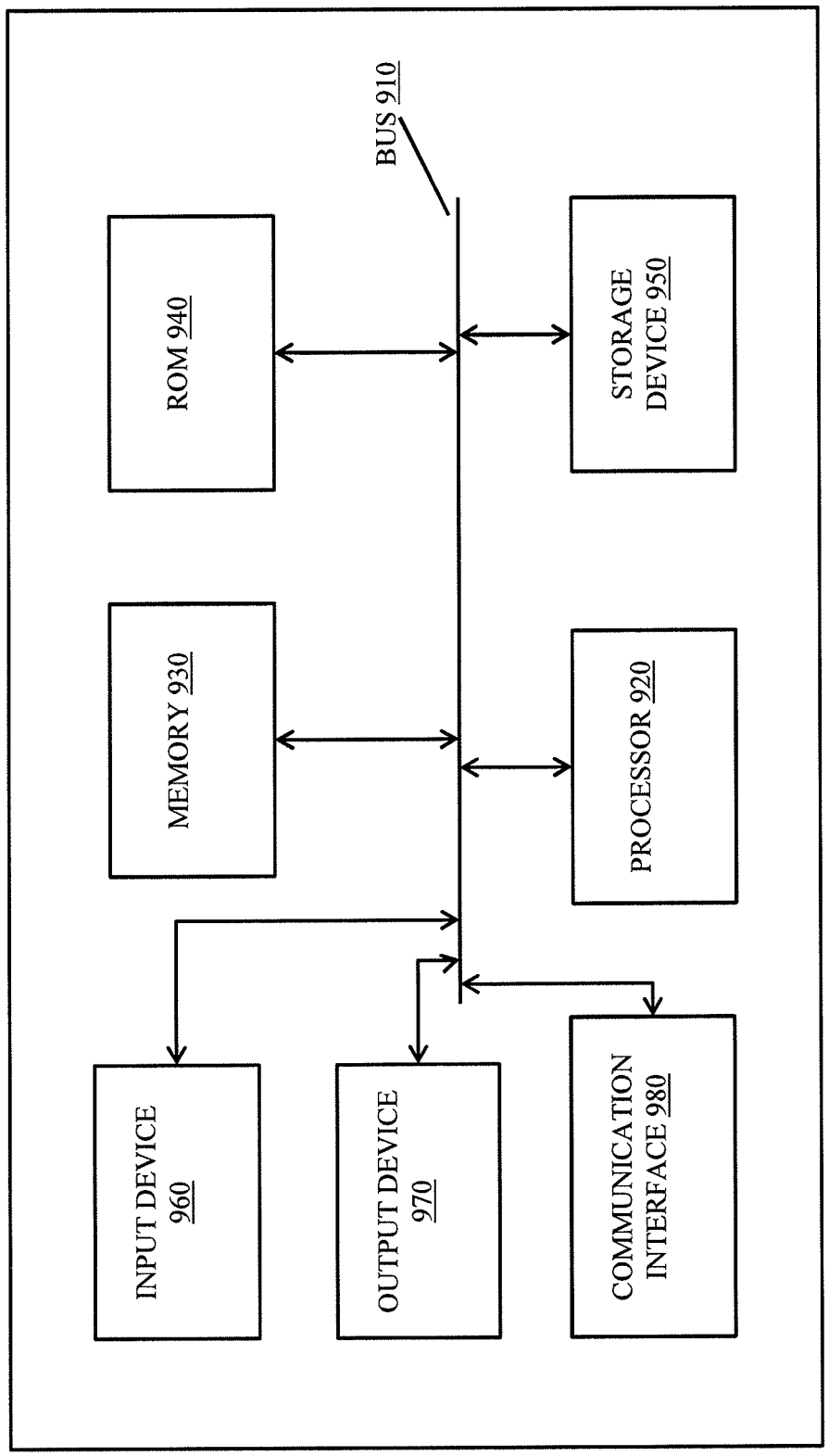
FIG. 9 depicts an exemplary architecture for implementing a computing device in accordance with one or more embodiments.

FIG. 9 depicts an exemplary architecture for implementing a computing device 900 in accordance with one or more embodiments, which may be used to implement any of market information buyer device 105, web server 110, user device 120, server 150, server 180, data cloud 135, data warehouse 140, or any other computer system or computing device component thereof. It will be appreciated that other devices that can be used with the computing device 900, such as a client or a server, may be similarly configured. As illustrated in FIG. 9, computing device 900 may include a bus 910, a processor 920, a memory 930, a read only memory (ROM) 940, a storage device 950, an input device 960, an output device 970, and a communication interface 980.

Bus 910 may include one or more interconnects that permit communication among the components of computing device 900. Processor 920 may include any type of processor, microprocessor, or processing logic that may interpret and execute instructions (e.g., a field programmable gate array (FPGA)). Processor 920 may include a single device (e.g., a single core) and/or a group of devices (e.g., multi-core). Memory 930 may include a random access memory (RAM) or another type of dynamic storage device that may store information and instructions for execution by processor 920. Memory 930 may also be used to store temporary variables or other intermediate information during execution of instructions by processor 920.

ROM 940 may include a ROM device and/or another type of static storage device that may store static information and instructions for processor 920. Storage device 950 may include a magnetic disk and/or optical disk and its corresponding drive for storing information and/or instructions. Storage device 950 may include a single storage device or multiple storage devices, such as multiple storage devices operating in parallel. Moreover, storage device 650 may reside locally on the computing device 900 and/or may be remote with respect to a server and connected thereto via network and/or another type of connection, such as a dedicated link or channel.

Input device 960 may include any mechanism or combination of mechanisms that permit an operator to input information to computing device 900, such as a keyboard, a mouse, a touch sensitive display device, a microphone, a pen-based pointing device, and/or a biometric input device, such as a voice recognition device and/or a finger print scanning device. Output device 970 may include any mechanism or combination of mechanisms that outputs information to the operator, including a display, a printer, a speaker, etc.

Communication interface 980 may include any transceiver-like mechanism that enables computing device 900 to communicate with other devices and/or systems, such as a client, a server, a license manager, a vendor, etc. For example, communication interface 980 may include one or more interfaces, such as a first interface coupled to a network and/or a second interface coupled to a license manager. Alternatively, communication interface 980 may include other mechanisms (e.g., a wireless interface) for communicating via a network, such as a wireless network. In one implementation, communication interface 980 may include logic to send code to a destination device, such as a target device that can include general purpose hardware (e.g., a personal computer form factor), dedicated hardware (e.g., a digital signal processing (DSP) device adapted to execute a compiled version of a model or a part of a model), etc.

Computing device 900 may perform certain functions in response to processor 920 executing software instructions contained in a computer-readable medium, such as memory 930. In alternative embodiments, hardwired circuitry may be used in place of or in combination with software instructions to implement features consistent with principles of the invention. Thus, implementations consistent with principles of the invention are not limited to any specific combination of hardware circuitry and software.

Exemplary embodiments may be embodied in many different ways as a software component. For example, it may be a stand-alone software package, a combination of software packages, or it may be a software package incorporated as a "tool" in a larger software product. It may be downloadable from a network, for example, a website, as a stand-alone product or as an add-in package for installation in an existing software application. It may also be available as a client-server software application, or as a web-enabled software application. It may also be embodied as a software package installed on a hardware device.

Numerous specific details have been set forth to provide a thorough understanding of the embodiments. It will be understood, however, that the embodiments may be practiced without these specific details. In other instances, well-known operations, components and circuits have not been described in detail so as not to obscure the embodiments. It can be appreciated that the specific structural and functional details are representative and do not necessarily limit the scope of the embodiments.

It is worthy to note that any reference to "one embodiment" or "an embodiment" means that a particular feature, structure, or characteristic described in connection with the embodiment is included in at least one embodiment. The appearances of the phrase "in one embodiment" in the specification are not necessarily all referring to the same embodiment.

Although some embodiments may be illustrated and described as comprising exemplary functional components or modules performing various operations, it can be appreciated that such components or modules may be implemented by one or more hardware components, software components, and/or combination thereof. The functional components and/or modules may be implemented, for example, by logic (e.g., instructions, data, and/or code) to be executed by a logic device (e.g., processor). Such logic may be stored internally or externally to a logic device on one or more types of computer-readable storage media.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of storage media include hard drives, disk drives, solid state drives, and any other tangible storage media.

It also is to be appreciated that the described embodiments illustrate exemplary implementations, and that the functional components and/or modules may be implemented in various other ways which are consistent with the described embodiments. Furthermore, the operations performed by such components or modules may be combined and/or separated for a given implementation and may be performed by a greater number or fewer number of components or modules.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated. In addition, the logic flow may be implemented by a hardware element, a software element executed by a processor, or any combination thereof.

While various exemplary embodiments have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

The invention claimed is:

1. A method to determine an unknown attribute of a user, the method comprising:
   producing, by executing first instructions on a processor, a reduced attribute vector based on an unclassified attribute vector and a projection matrix, the unclassified attribute vector including a known attribute value of the user and an unknown attribute value of the user, the projection matrix generated based on a correlation between a plurality of attribute vectors for a first plurality of users and a plurality of attribute vectors for a second plurality of users on a panel, and the reduced attribute vector having fewer attributes than the unclassified attribute vector;
   producing, by executing second instructions on the processor, a plurality of reduced panel attribute vectors based on a plurality of classified panel attribute vectors of the second plurality of users from the panel and the projection matrix, wherein the reduced panel attribute vectors have fewer attributes than the classified panel attribute vectors, and the user is not one of the second plurality of users from the panel; and
   determining, by executing third instructions on the processor, the unknown attribute of the user based on the reduced attribute vector, the plurality of reduced panel attribute vectors, and known attributes of the second plurality of the users of the panel, wherein the known attributes correspond to different reduced panel attribute vectors.

2. The method of claim 1, further including generating the projection matrix by at least one of a canonical correlation analysis, a principal component analysis, an independent component analysis, a co-correspondence analysis, or any adaptation thereof.

3. The method of claim 1, wherein the projection matrix is selected from a plurality of candidate rotations based on at least one of a holdout performance and a cross validation performance.

4. The method of claim 1, wherein a first number of attributes of the reduced attribute vector is substantially less than a second number of attributes of the unclassified attribute vector.

5. The method of claim 1, further including receiving a message, via a computer network, containing information indicative of the known attribute value of the unclassified attribute vector.

6. The method of claim 1, wherein the determining of the unknown attribute of the user based on the reduced attribute vector, the plurality of reduced panel attribute vectors, and the known attributes further includes:
   identifying ones of the plurality of reduced panel attribute vectors that are nearest neighbors based on a similarity between the ones of the plurality of reduced panel attribute vectors and the reduced attribute vector; and
   determining the unknown attribute using an attribute corresponding to the nearest neighbors.

7. The method of claim 1, further including:
   repeating the determining of the unknown attribute for a plurality of users and a plurality of unclassified attribute vectors; and
   determining a segment of the plurality of users sharing a value of the unknown attribute.

8. The method of claim 1, wherein the unknown attribute expires after a time-to-live period that begins when the unknown attribute is determined.

9. A method for scaling a panel, the method comprising:
   producing, by executing first instructions on a processor, a reduced attribute matrix based on a first unclassified attribute matrix and a projection matrix, the first unclassified attribute matrix including known attribute values of users and unknown attribute values of the users, the projection matrix generated based on a correlation between a plurality of attribute vectors for a first plurality of users and a plurality of attribute vectors for a second plurality of users on a first panel, and the reduced attribute matrix having fewer attributes than the unclassified attribute matrix;
   producing, by executing second instructions on the processor, a reduced panel attribute matrix based on a classified panel attribute matrix from a second panel and the projection matrix, wherein the first panel and the second panel are different and users represented by the reduced panel attribute matrix are not shared between the first panel and the second panel; and
   determining, by executing third instructions on the processor, the unknown attributes of the first plurality of users based on the reduced attribute matrix, the reduced panel attribute matrix, and a plurality of known attributes that correspond to the reduced panel attribute matrix.

10. The method of claim 9, the method further including:
determining an inferred matrix based on the determined unknown attributes of the first plurality of users, the inferred matrix including attributes of the first unclassified attribute matrix, attributes of the classified panel attribute matrix, the second plurality of users from the first panel, and a third plurality of users represented by the reduced panel attribute matrix; and
producing the reduced panel attribute matrix based on the inferred matrix and a second unclassified attribute matrix of a fourth plurality of users as the first unclassified attribute matrix to determine unknown attributes of the fourth plurality of users.

11. A system to determine an unknown attribute of a user, the system comprising:
a memory including instructions; and
a processor configured to execute the instructions to:
produce a reduced attribute vector using an unclassified attribute vector and a projection matrix, the unclassified attribute vector including a known attribute value of the user and an unknown attribute value of the user, the projection matrix generated based on a correlation between a plurality of attribute vectors for a first plurality of users and a plurality of attribute vectors for a second plurality of users of a panel, the reduced attribute vector having fewer attributes than the unclassified attribute vector;
produce a plurality of reduced panel attribute vectors based on a plurality of classified panel attribute vectors of the second plurality of users on the panel and the projection matrix, wherein the reduced panel attribute vectors have fewer attributes than the classified panel attribute vectors, and the user is not one of the second plurality of users from the panel; and
determine the unknown attribute of the user based on the reduced attribute vector, the plurality of reduced panel attribute vectors, and known attributes, wherein each of the known attributes corresponds to a different reduced panel attribute vector.

12. The system of claim 11, wherein the processor is to generate the projection matrix by at least one of a canonical correlation analysis, a principal component analysis, an independent component analysis, a co-correspondence analysis, or any adaptation thereof.

13. The system of claim 11, wherein the projection matrix is selected from a plurality of candidate rotations based on at least one of a holdout performance and a cross validation performance.

14. The system of claim 11, wherein a first number of attributes of the reduced attribute vector is substantially less than a second number of attributes of the unclassified attribute vector.

15. The system of claim 11, wherein the processor is to execute the instructions obtain a message, via a computer network, containing information indicative of the known attribute value of the unclassified attribute vector.

16. The system of claim 11, wherein the processor is to execute the instructions to determine the unknown attribute of the user based on the reduced attribute vector, the plurality of reduced panel attribute vectors, and the known attributes and the processor is execute the instructions to:
identify ones of the plurality of reduced panel attribute vectors that are nearest neighbors based on a similarity between the ones of the plurality of reduced panel attribute vectors and the reduced attribute vector; and
determine the unknown attribute using an attribute corresponding to the nearest neighbors.

17. The system of claim 11, wherein the processor is further to execute the instructions to:
determine a plurality of values of the unknown attribute for a plurality of users using a plurality of unclassified attribute vectors; and
determine a segment of the plurality of users sharing a value of the unknown attribute.

18. The system of claim 11, wherein the unknown attribute expires after a time-to-live period that begins when the unknown attribute is determined.

19. A system for scaling a panel, the system comprising:
a memory; and
a processor configured to:
produce a reduced attribute matrix based on a first unclassified attribute matrix and a projection matrix, the first unclassified attribute matrix including known attribute values of users and unknown attribute values of the users, the projection matrix generated based on a correlation between a plurality of attribute vectors for a first plurality of users and a plurality of attribute vectors for a second plurality of users, the second plurality of users in a first panel, and the reduced attribute matrix having fewer attributes than the unclassified attribute matrix;
produce a reduced panel attribute matrix based on a classified panel attribute matrix from a second panel and the projection matrix, the first panel and the second panel being different, users represented by the reduced panel attribute matrix are not shared between the first panel and the second panel; and
determine unknown attributes of the first plurality of users based on the reduced attribute matrix, the reduced panel attribute matrix, and a plurality of known attributes that correspond to the reduced panel attribute matrix.

20. The system of claim 19, wherein the processor is further configured to:
determine an inferred matrix based on the determined unknown attributes of the first plurality of users, the inferred matrix including attributes of the first unclassified attribute matrix, attributes of the classified panel attribute matrix, attributes of the second plurality of users from the first panel, and attributes of a third plurality of users represented by the reduced panel attribute matrix; and
produce the reduced panel attribute matrix based on the inferred matrix and a second unclassified attribute matrix of a fourth plurality of users as the first unclassified attribute matrix to determine unknown attributes of the fourth plurality of users.

21. At least one of a hardware storage device or a storage disk comprising instructions that, when executed, cause a machine to at least:
produce a reduced attribute vector based on an unclassified attribute vector and a projection matrix, the unclassified attribute vector including a known attribute value of a user and an unknown attribute value of the user, the projection matrix generated based on a correlation between a plurality of attribute vectors for a first plurality of users and a plurality of attribute vectors for a second plurality of users on a panel, and the reduced attribute vector having fewer attributes than the unclassified attribute vector;

produce a plurality of reduced panel attribute vectors based on a plurality of classified panel attribute vectors of the second plurality of users from the panel and the projection matrix, wherein the reduced panel attribute vectors have fewer attributes than the classified panel attribute vectors, and the user is not one of the second plurality of users from the panel; and determine the unknown attribute of the user based on the reduced attribute vector, the plurality of reduced panel attribute vectors, and known attributes of the second plurality of the users of the panel, wherein the known attributes correspond to different reduced panel attribute vectors.

22. The at least one of the hardware storage device or the storage disk of claim 21, wherein the instructions, when executed, cause the machine to generate the projection matrix by at least one of a canonical correlation analysis, a principal component analysis, an independent component analysis, a co-correspondence analysis, or any adaptation thereof.

23. The at least one of the hardware storage device or the storage disk of claim 21, wherein the projection matrix is selected from a plurality of candidate rotations based on at least one of a holdout performance and a cross validation performance.

24. The at least one of the hardware storage device or the storage disk of claim 21, wherein a first number of attributes of the reduced attribute vector is substantially less than a second number of attributes of the unclassified attribute vector.

25. The at least one of the hardware storage device or the storage disk of claim 21, wherein the instructions, when executed, cause the machine to receive a message, via a computer network, containing information indicative of the known attribute value of the unclassified attribute vector.

26. The at least one of the hardware storage device or the storage disk of claim 21, wherein the instructions, when executed, cause the machine to determine the unknown attribute of the user based on the reduced attribute vector, the plurality of reduced panel attribute vectors, and the known attributes and the at least one of the hardware storage device or the storage disk further instructions that, when executed, cause the machine to:
identify ones of the plurality of reduced panel attribute vectors that are nearest neighbors based on a similarity between the ones of the plurality of reduced panel attribute vectors and the reduced attribute vector; and
determine the unknown attribute using an attribute corresponding to the nearest neighbors.

27. The at least one of the hardware storage device or the storage disk of claim 21, further including instructions that, when executed, cause the machine to:

determine a plurality of values of the unknown attribute for a plurality of users using a plurality of unclassified attribute vectors; and determine a segment of the plurality of users sharing a value of the unknown attribute.

28. The at least one of the hardware storage device or the storage disk of claim 21, wherein the unknown attribute expires after a time-to-live period that begins when the unknown attribute is determined.

29. At least one of a hardware storage device or a storage disk comprising instructions that, when executed, cause a machine to:

produce a reduced attribute matrix based on a first unclassified attribute matrix and a projection matrix, the first unclassified attribute matrix including known attribute values of users and unknown attribute values of the users, the projection matrix generated based on a correlation between a plurality of attribute vectors for a first plurality of users and a plurality of attribute vectors for a second plurality of users on a first panel, and the reduced attribute matrix having fewer attributes than the unclassified attribute matrix;

produce a reduced panel attribute matrix based on a classified panel attribute matrix from a second panel and the projection matrix, wherein the first panel and the second panel are different, and users represented by the reduced panel attribute matrix are not shared between the first panel and the second panel; and determine unknown attributes of the first plurality of users based on the reduced attribute matrix, the reduced panel attribute matrix, and a plurality of known attributes that correspond to the reduced panel attribute matrix.

30. The at least one of the hardware storage device or the storage disk of claim 29, further including instructions that, when executed, cause the machine to:

determine an inferred matrix based on the determined unknown attributes of the first plurality of users, the inferred matrix including attributes of the first unclassified attribute matrix, attributes of the classified panel attribute matrix, the second plurality of users from the first panel, and a third plurality of users represented by the reduced panel attribute matrix; and produce the reduced panel attribute matrix based on the inferred matrix and a second unclassified attribute matrix of a fourth plurality of users as the first unclassified attribute matrix to determine unknown attributes of the fourth plurality of users.

* * * * *

UNITED STATES PATENT AND TRADEMARK OFFICE
CERTIFICATE OF CORRECTION

PATENT NO. : 9,269,049 B2  
APPLICATION NO. : 13/889588  
DATED : February 23, 2016  
INVENTOR(S) : McCann et al.

Page 1 of 1

It is certified that error appears in the above-identified patent and that said Letters Patent is hereby corrected as shown below:

Claims

Column 19, line 41, claim 26:  after "the storage disk further", add --includes--

Signed and Sealed this  
Third Day of May, 2016

Michelle K. Lee  
*Director of the United States Patent and Trademark Office*